INVENTOR:-
Hans Blatter,
BY
Pierce, Scheffler & Parker,
Attorneys.

Dec. 16, 1952   H. BLATTER   2,622,234
MECHANICAL CURRENT CONVERTER WITH APPARATUS FOR
MONITORING THE SYNCHRONOUSLY ACTUATED SWITCHES
Filed Jan. 9, 1950   2 SHEETS—SHEET 2
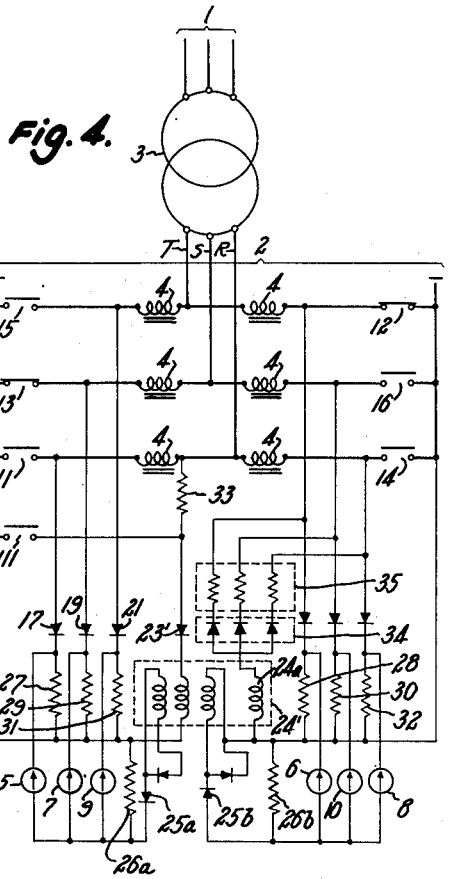
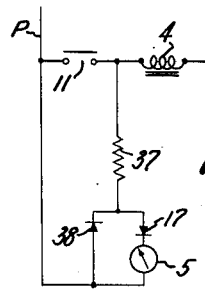
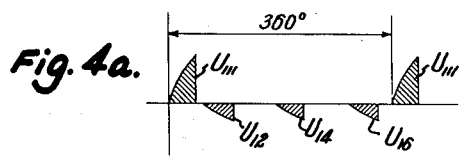
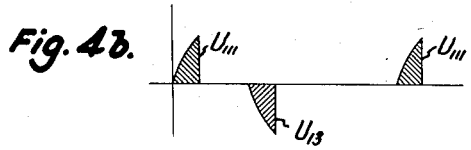
INVENTOR:-
Hans Blatter,
BY
Pierce, Scheffler & Parker,
Attorneys.

Patented Dec. 16, 1952

2,622,234

UNITED STATES PATENT OFFICE 2,622,234

MECHANICAL CURRENT CONVERTER WITH APPARATUS FOR MONITORING THE SYNCHRONOUSLY ACTUATED SWITCHES

Hans Blatter, Wettingen, Switzerland, assignor to Aktiengesellschaft Brown, Boveri & Cie, Baden, Switzerland, a joint-stock company Application January 9, 1950, Serial No. 137,664
In Switzerland January 20, 1949

8 Claims. (Cl. 321—48)

This invention relates to mechanical current converters with synchronously actuated switches for connecting an alternating current power network to a direct current load network, or vice versa, and more particularly to a mechanical current converter which includes monitoring apparatus or circuits which afford a continuous indication of the timing of the closures of the individual synchronously actuated switches of the converter.

A type of switch which is frequently employed in mechanical current converters comprises a bridge contact which is actuated by a push rod into and out of engagement with a pair of spaced stationary contacts, and it has been proposed to regulate the duration of closed-contact intervals of a plurality of such switches in a converter network by a simultaneous adjustment of the lengths of the several push rods. Uneven wear of contact material of the different switches may result in a gradual change in the effective adjustment of the several bridge contacts with respect to each other, and it is therefore desirable to detect an improper timing of any one switch as soon as it develops, whereby the attendant may be able to re-adjust the length of the push rod of that switch to restore normal operation.

An object of the invention is to provide a mechanical current converter which includes monitoring apparatus or circuits that afford a continuous indication of the timing of the closures of the individual synchronously actuated switches of the converter. An object is to provide a mechanical current converter including a monitoring system which measures, and which compares with a reference voltage, the contact voltage across a pair of switch contacts at the instant that the contacts close shortly after the line voltage has passed through zero. Other objects of the invention are to provide mechanical contact rectifiers of the type stated in which the reference voltage may be the average of the contact voltages of all of the synchronously actuated switches or may be a voltage of fixed magnitude derived from some source other than the electrical networks which are connected by the converter.

This and other objects and the advantages of the invention will be apparent from the following specification when taken with the accompanying drawings in which:

Figs. 2, 3 and 4 are schematic circuit diagrams of mechanical current rectifiers embodying the invention;

Figs. 2a, 3a, 4a and 4b are diagrams showing voltage relations across different points in the rectifiers of Figs. 2, 3 and 4; and Fig. 5 is a fragmentary circuit diagram of another embodiment of the invention.

The invention will be described as incorporated in an electrical network for energizing a direct current load circuit from a three phase alternating current power line through a full wave rectifier. The synchronous motor for operating the switches and the individually adjustable push rods which directly actuate the several switches are not illustrated in the circuit diagrams since they form no part of the present invention. As a matter of fact, the invention is also of utility when incorporated in any mechanical current converters since the monitoring system affords a continuous indication of the timing of the switch closures whether or not the timing of the switches can be adjusted while the converter is in operation.

Figure 1:
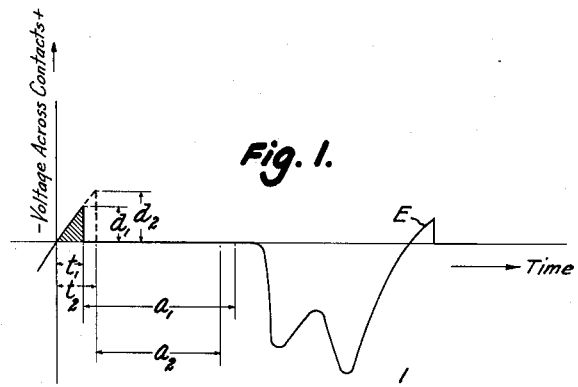
Fig. 1 is a curve sheet showing the variation, during one cycle, of the voltage across the contacts of one of the synchronous switches of a mechanical current rectifier.

The curve E of Fig. 1 shows the variation of the voltage across the contacts of one of the switches of a rectifier system over a time interval of something more than one cycle. The contact switch should close at a time $t_1$ after the alternating current voltage E passes through zero and increases to a value $d_1$, and the contact switch should open after a time interval $a_1$; these values being selected in accordance with good design practice for the particular network and its operating characteristics. If the switch is opened by a cam-actuated push rod and closed by a spring, a push rod of more than normal length will delay the closure of the switch until time $t_2$ at which the voltage across the switch has risen to a value $d_2$ and will open the switch after a shortened interval $a_2$. It will thus be seen that there is a definite relation between the duration of the switch closure, the timing of the opening and of the closing of the switch, and the "contact voltage"; the term "contact voltage" being used herein to identify the voltage across the switch contacts at the instant of their closure. The contact voltage thus varies with and may be measured to indicate and/or control the duration of switch-closed intervals of the individual switches of a mechanical current rectifier.

Figure 2:
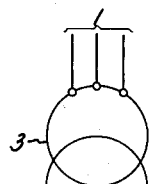
Figure 2A:
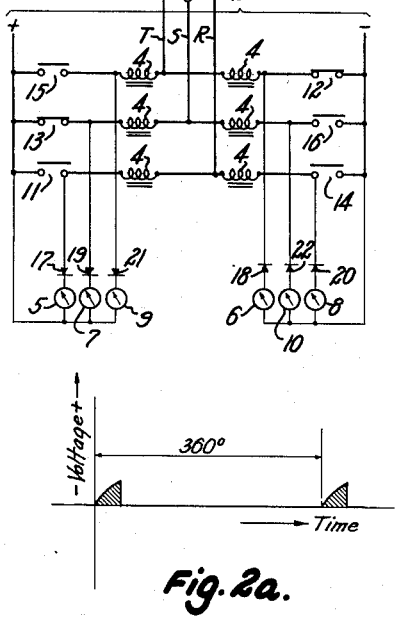

In the rectifier system of Fig. 2, a three phase alternating current network 1 energizes a direct current load circuit 2 of two-wire type having a positive conductor P and a negative conductor N, through a transformer 3 having three output phases or lines T, S and R respectively. For full-wave rectification, each phase or line is branched and connected to both conductors of the load circuit through individual choke coils 4 and contact switches, with contact voltage measuring circuits including instruments 5 to 10 shunted across the switches. There are six switches, since there are six connections from the alternating current lines T, S and R to the direct current conductors P, N, and the switches are identified by reference numerals 11 to 16 which indicate the order of the cyclic closing of the switches. Blocking cells or rectifiers 17 to 22 are in series with the instruments 5 to 10 in the measuring circuits which are shunted across the switches 11 to 16 respectively. The cells are so connected in the several measuring circuits as to block a flow of current from the load circuit to alternating current network. For example, during negative half-cycles of phase R, the switch 11 is open but the positive voltage on conductor P can not establish a current through instrument 5 in view of the high resistance of blocking cell 17 to reverse currents. However, as the voltage of phase R rises through zero to positive values, the low forward resistance of the blocking cell 17 permits current flow from phase R to conductor P through the instrument 5. The instruments 5 to 10 may be alternating current ammeters or may be direct current ammeters of the permanent magnet-moving coil type which are damped or shunted by condensers to respond to the average value of the current pulses which occur one in each cycle or 360 electrical degrees in each measuring circuit, as indicated in Fig. 2a.

When the switch apparatus is initially adjusted for the same desired closure periods for all switches, all of the instruments will exhibit the same deflection which, if desired, may be noted by index marks placed on the scales of the several instruments. So long as the deflections or readings of all instruments drift away from the index mark to the same degree, the initial operating conditions may be restored by a simultaneous adjustment of the lengths of all push rods. However, if the deflection of any one instrument departs from the substantially equal deflections of the other instruments, it is apparent that there has been an unduly rapid wear of the contact material of the associated switch and that the length of the push rod of that switch should be individually adjusted to restore normal operating conditions.

The adjustments of lengths of the push rods is made manually when, as illustrated schematically, the instruments 5 to 10 are measuring instruments and do not include relay contacts for energizing motors to effect the required adjustments. The adjusting mechanism is preferably so designed and constructed that the indicated regulations may be made without taking the rectifier out of service but, as above noted, the particular design of the adjusting mechanism is not a part of the present invention.

Figure 3:
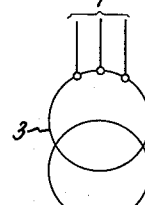

In place of a visual comparison by the attendant of the reading of each instrument with the average readings of the other instruments, it is possible to develop a reference voltage which is the mean of the contact voltages of all of the switches, and to measure the difference between the individual contact voltages and this reference voltage. In monitoring apparatus of this type, as shown in Fig. 3, the rectifier system includes all of the elements of the Fig. 2 circuit and, except as described later, the relative arrangement and circuit connections are identical with those of Fig. 2. The basic elements of the rectifying and measuring system are identified by the same reference numerals as in Fig. 2, but will not be described in detail.

Figure 3A:
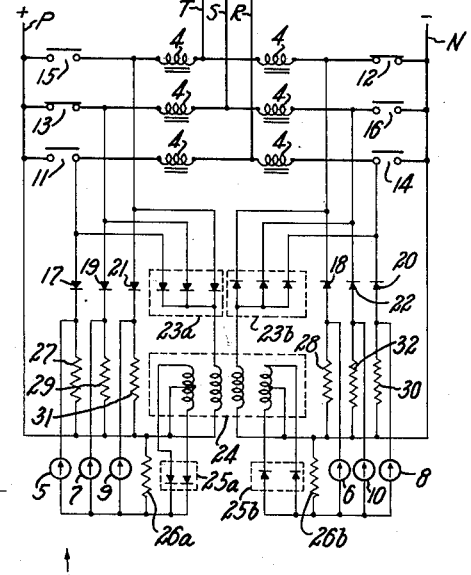

The additional elements for developing a standard or reference voltage include a transformer 24 with two sets of primary and secondary windings, one set being associated with switches 11, 13, 15 which connect the three phase network to the positive conductor P and the other set being associated with the switches 12, 14, 16 which connect the power network to the negative conductor N. The primary windings are connected in parallel, through sets of individual blocking cells 23a, 23b to the alternating current sides of their associated switches, while the secondary windings have center taps connected to the direct current conductors P, N respectively, and have their ends returned to the associated conductor over rectifiers 25a, 25b and resistors 26a, 26b, respectively. The primary windings are thus excited in sequence by current pulses resulting from the contact voltages across switches 11 to 16 to develop in the secondary windings an alternating current voltage of six times the frequency of the alternating current network. The transformation ratio of transformer 24 is such that the time-averaged value $U_m$, see Fig. 3a, of the voltage pulses 11' to 16' developed across the resistors 26a, 26 constitutes a standard for the time-averaged value of voltage pulses derived from the contact voltages of the several switches, for example the averaged value $U'_{11}$ of voltage pulse $U_{11}$ derived from the cyclic contact voltage pulses across switch 11.

Resistors 27 to 32 are connected between the blocking cells 17 to 22 respectively and their associated load conductors, and the instruments 5 to 10 are not connected directly to the conductors P or N, but are connected to the terminals of resistors 26a, 26b remote from the conductors P and N respectively. The instruments thus measure the difference between the time-averaged values of the voltage pulses established across the resistors 27 to 32 respectively and the standard or reference voltages developed across resistors 26a or 26b. Under proper operating conditions, all instrument readings should be zero. The instruments are zero-center direct current instruments and, with the illustrated circuit connections, are of conventional permanent magnet-moving coil type. Zero center instruments of cross-coil type could be employed, the coils being shunted across the respective resistors whose voltage drops are to be compared, for example across resistors 26a and 27 to compare the contact voltage of switch 11 to the standard voltage across resistor 26a.

It is also possible, as shown in Fig. 4, to develop a reference voltage by means of an auxiliary switch 111 which is actuated in synchronism with, but which need not have the same closed-period characteristics as, the commutating switch 11. A series resistor 33 connects the alternating current side of switch 111 to phase R at the transformer side of the choke 4 which is in series with the switch 11. The circuit arrangement is generally similar to that of the Fig. 3 circuit and like parts are identified by the same reference numerals in both views. A transformer 24' for developing reference voltages across resistors 26a, 26b has a single primary winding which is energized from phase R through a resistor 33 and a blocking cell 23', the respective secondary windings being connected through rectifiers 25a, 25b to establish current pulses through resistors 26a, 26b respectively to develop reference voltages across the same. The transformer 24' also has a premagnetization winding 24a which is connected through sets of blocking cells 34 and resistors 35 to the alternating current sides of the switches 12, 14 and 16. The purpose of the winding 24a is to compensate for the direct current component in transformer 24' by developing a premagnetization current corresponding to the mean contact voltages of the switches 12, 14 and 16. As shown in Fig. 4a, voltage peak $U_{111}$ corresponds to the contact voltage across the auxiliary switch 111, and voltage peaks $U_{12}$, $U_{14}$ and $U_{16}$ indicate the voltage pulses which develop the premagnetizing current pulses. As indicated in Fig. 4b, the contact voltages across the switch 13 will develop a voltage surge $U_{13}$ across its associated resistor 29 which is of the same magnitude, but of a polarity opposite to, the reference voltage $U_{111}$ established across resistors 26a and 26b. Similarly, the contact voltages across the other switches develop voltage surges which are equal to the reference voltage surge, but of opposite polarity, as long as all switches are correctly timed.

As shown in the fragmentary diagram, Fig. 5, a resistor 37 may be connected between the blocking cell 17 of a measuring circuit and its associated commutating switch, and a reversely arranged blocking cell 38 may be shunted across, in series, the measuring instrument 5 and blocking cell 17. The advantage of this measuring circuit construction is that the blocking cells are subjected only to relatively small reverse voltages.

It is to be understood that the invention is not limited to the particular circuit arrangements herein shown and described since various changes which may occur to those familiar with converter design and construction fall within the spirit and scope of the invention as set forth in the following claims.

I claim:

1. In a mechanical current converter, the combination with input lines for connection to an alternating current power source, output conductors for connection to a direct current load circuit, a switch choke coil in each input line, and a plurality of switches to be actuated mechanically in synchronism with the alternating current power source, said switches being individually connected between the respective switch choke coils of said input lines and said output conductors; of monitoring means for developing electrical values significant of the contact voltages across the individual switches at the closures thereof; said monitoring means comprising measuring circuits individual to and connected across the several switches, each measuring circuit including in series an electrical instrument and a blocking cell, the blocking cell preventing reverse current flow through said measuring circuit from said output conductors to said input lines.

2. In a mechanical current converter, the invention as recited in claim 1, wherein each measuring circuit includes a series resistor, the blocking cell and electrical instrument being directly connected, and a second blocking cell shunted across the series assembly of said first blocking cell and instrument; the blocking cells being oppositely arranged in the measuring circuit.

3. In an alternating current mechanical current converter, the combination with input lines for connection to an alternating current power source, output conductors for connection to a direct current load circuit, a switch choke coil in each input line, and a plurality of switches to be actuated mechanically in synchronism with the alternating current power source, said switches being individually connected between the respective switch choke coils of said input lines and said output conductors; of monitoring means for developing electrical values significant of the contact voltages across the individual switches at the closures thereof; said monitoring means comprising a circuit shunted across each of said switches; each of said circuits includes a resistor across which a voltage pulse is developed by the contact voltage at the associated switch at the instant of closure thereof, and a blocking cell in series with said resistor to prevent current flow in that circuit in a direction from the output conductors to the input lines; means for developing a reference voltage proportional to the mean contact voltage developed at all of said switches; and measuring circuits for comparing the voltage pulses developed across the individual resistors with said reference voltage.

4. In a mechanical current rectifier, the invention as recited in claim 3; wherein said means for developing a reference voltage includes a voltage transformer having a primary winding with one terminal connected to one of said output conductors, blocking cells connected between the other transformer terminal and the input line side of each switch which supplies current to said one conductor, a secondary winding on said transformer, a reference resistor and a rectifier connected across said secondary winding, and a connection from one terminal of said reference resistor to said one conductor.

5. In a mechanical current converter, the invention as recited in claim 3; wherein said means for developing a reference voltage includes an auxiliary switch synchronized with one of said plurality of switches.

6. In a mechanical current converter, the invention as recited in claim 5; wherein said means for developing a reference voltage includes a transformer energized by the contact voltage of said auxiliary switch.

7. In a mechanical current converter, the invention as recited in claim 5; wherein said means for developing a reference voltage includes a transformer energized by the contact voltage of said auxiliary switch, a premagnetization winding on said transformer, and means for establishing in said premagnetization winding a current proportional to the mean value of the contact voltages at said plurality of switches.

8. In a mechanical current rectifier, the invention as recited in claim 5, wherein said auxiliary switch is connected between one of said output conductors and a line at the power source side of the choke coil therein.

HANS BLATTER.

REFERENCES CITED

The following references are of record in the file of this patent:

UNITED STATES PATENTS

| Number | Name | Date |
|---|---|---|
| 1,529,341 | Burnham | Mar. 10, 1925 |
| 2,188,361 | Koppelmann | Jan. 30, 1940 |
| 2,242,956 | Knapp | May 20, 1941 |
| 2,465,682 | Goldstein | Mar. 29, 1949 |
| 2,557,739 | Goldstein et al. | June 19, 1951 |
| 2,557,740 | Goldstein et al. | June 19, 1951 |